United States Patent [19]

Smith-Williams

[11] Patent Number: 4,580,808
[45] Date of Patent: Apr. 8, 1986

[54] FLAT BAR TORSION SPRING ASSEMBLY FOR TRAILERS AND OTHER VEHICLES

[76] Inventor: Margie M. Smith-Williams, 7929 Stewart & Gray, #10, Downey, Calif. 90241

[21] Appl. No.: 642,196

[22] Filed: Aug. 20, 1984

Related U.S. Application Data

[63] Continuation-in-part of Ser. No. 432,535, Dec. 15, 1982, abandoned.

[51] Int. Cl.$^4$ .............................................. B60G 11/18
[52] U.S. Cl. ...................................... 280/700; 280/723; 267/57
[58] Field of Search ............... 280/689, 697, 700, 715, 280/716, 717, 721, 723; 267/21 R, 54 A, 57.1 R, 57

[56] References Cited

U.S. PATENT DOCUMENTS

| | | | |
|---|---|---|---|
| 2,540,279 | 2/1951 | Mosier | 280/414.2 |
| 2,643,890 | 6/1953 | Smith | 280/423 A |
| 2,977,132 | 3/1961 | Bainbridge | 280/723 |
| 3,108,822 | 10/1963 | Tantlinger et al. | 280/682 |
| 3,157,242 | 11/1964 | Kozicki | 180/73.1 |
| 3,430,978 | 3/1969 | Fortier | 280/723 |
| 3,661,286 | 5/1972 | Smith | 414/483 |
| 3,797,850 | 3/1974 | Stout et al. | 280/789 |
| 4,094,532 | 6/1978 | Johnson et al. | 280/695 |
| 4,095,818 | 6/1978 | Smith | 280/789 |
| 4,206,935 | 6/1980 | Sheppard et al. | 280/723 |
| 4,291,895 | 9/1981 | Wohrle et al. | 280/723 |

Primary Examiner—Richard A. Bertsch
Attorney, Agent, or Firm—Keith D. Beecher

[57] ABSTRACT

A simplified and economical flat bar torsion spring suspension assembly for trailers or other vehicles which extends between two wheels of the vehicle and which comprises a flat torsion bar for each wheel, each end of the torsion bar being received in a sliding fit in a corresponding socket. A socket at the end of the torsion bar adjacent to the corresponding wheel is rotatably mounted in the a housing which can double as frame of the trailer, and the socket at the other end of the torsion bar is held against rotation by the frame. A radial arm is attached to the rotatable socket and the corresponding wheel of the vehicle is mounted on the end of the radial arm. In the embodiments to be described, the housing for the suspension assembly can be used as the frame of the vehicle or merely a convenient package for ease of attachment and containment of a possibly cumbersome assembly.

9 Claims, 5 Drawing Figures

FLAT BAR TORSION SPRING ASSEMBLY FOR TRAILERS AND OTHER VEHICLES

This application is a continuation-in-part of Copending Application Ser. No. 432,535 which was filed Dec. 15, 1982, and which has now been abandoned.

BACKGROUND OF THE INVENTION

The flat bar torsion spring suspension assembly of the present invention is of the same general type as disclosed in Bainbridge U.S. Pat. No. 2,977,132, and like the Bainbridge suspension assembly, the assembly of the present invention provides a resilient means for securing the wheels of a trailer, or other vehicle, to the frame. However, the arrangement described in the Bainbridge patent is more complex and expensive to produce in volume than the assembly of the present invention, and it does not encase the suspension assembly into a housing which simplifies attachment to a frame and permits incorporation into a frame and a housing acts to protect the working parts from the elements, as is the case with the embodiments of the invention to be described in the following specification.

The assembly of the present invention is also advantageous over Bainbridge, in that the torsion bar is held in corresponding sockets without holes and bolts. The absence of holes in the torsion bar reduces stress risers and decreases manufacturing costs significantly. It is also then much simpler to configure the socket to receive one, two or more torsion bars thereby adjusting the spring rate.

The suspension assembly of the invention is also advasntageous in that is provides for the wheels at each side of the vehicle to be individually suspended, so that torsion bar configurations of different strengths may be used, if so desired, for the different wheels of the vehicle as a function of the load distribution. Because independent suspension assemblies are provided on each side of the frame of the vehicle, the frame width may be easily varied by changing the length of a center connector. Additional assemblies can also be easily added in tandem or triplex by simply adding a frame rail between assemblies in the lengthwise direction. This is in contrast to the current requirement for an entirely new system and in contrast to the Bainbridge patent which would require additional frame considerations.

An important feature of the suspension assembly of the invention is that it is simple and inexpensive in its construction, and it may be manufactured simply and easily, and assembled and mounted on a vehicle with a minimum of effort. Furthermore, since the housing for the suspension assembly, in the embodiment to be described, can double as the frame for the vehicle, the overall resultant weight requirements of the vehicle may be reduced with a subsequent reduction in moment of inertia, which is highly desirable for trailer stability.

To reiterate, the suspension assembly of the invention is advantageous over the prior art assemblies in that it is simple in its design, and in that it is relatively easy and inexpensive to manufacture; in that the housing is designed in and with the suspension making them an integral part capable of being moved as a unit; in that its width is adjustable to accommodate different vehicle frame configurations; in that the housing may become integral with existing vehicle frames, or bolted onto existing frames if so desired, with no elaborate borate mounting structure or separate framework being required; and in that the heat treated flat torsion bar is mounted in the assembly without holes which reduces stress concentrations and decreases production costs.

As described above, the suspension assembly of the invention may be manufactured with the entire assembly housed inside and protected by the framework of the trailer housing. Since the housing can then double as the framework of the trailer, the trailer itself may then be designed around the suspension assembly so that it may be easily assembled and disassembled. This permits the trailer to be carried to the loading site in a disassembled state on the towing vehicle, and to be assembled with a minimum of effort at the loading site.

DETAILED DESCRIPTION OF THE ILLUSTRATED EMBODIMENTS

Figure 1:
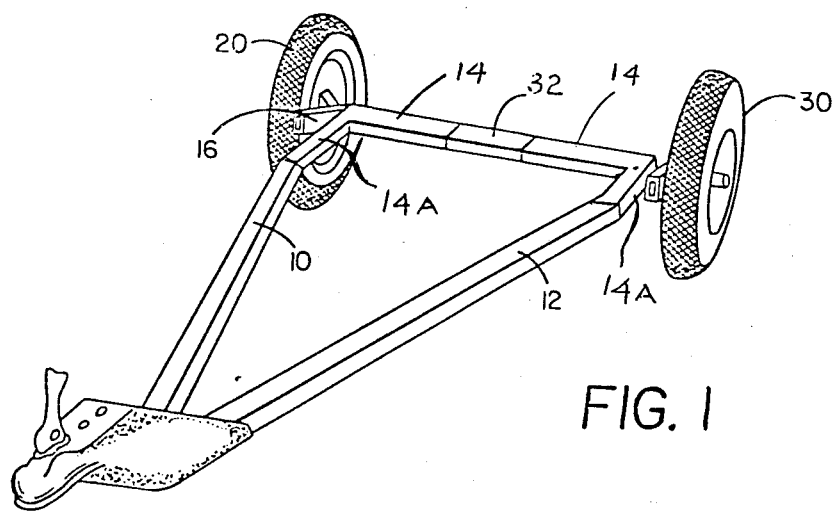
FIG. 1 is a perspective view of a trailer which incorporates the flat bar torsion spring suspension assembly of one embodiment of the invention.
Figure 2:
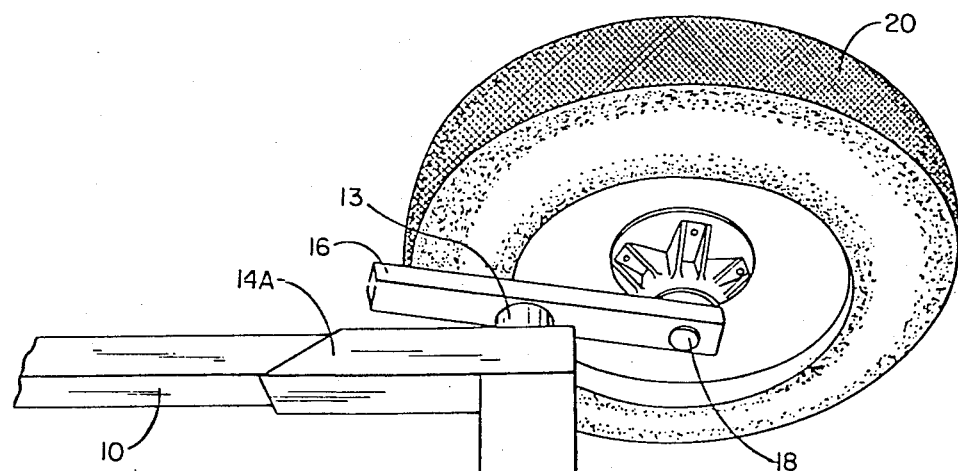
FIG. 2 is a perspective view of one corner of the trailer of FIG. 1, showing in more detail the various components of the suspension assembly of the invention as related to one wheel of the vehicle.
Figure 2:
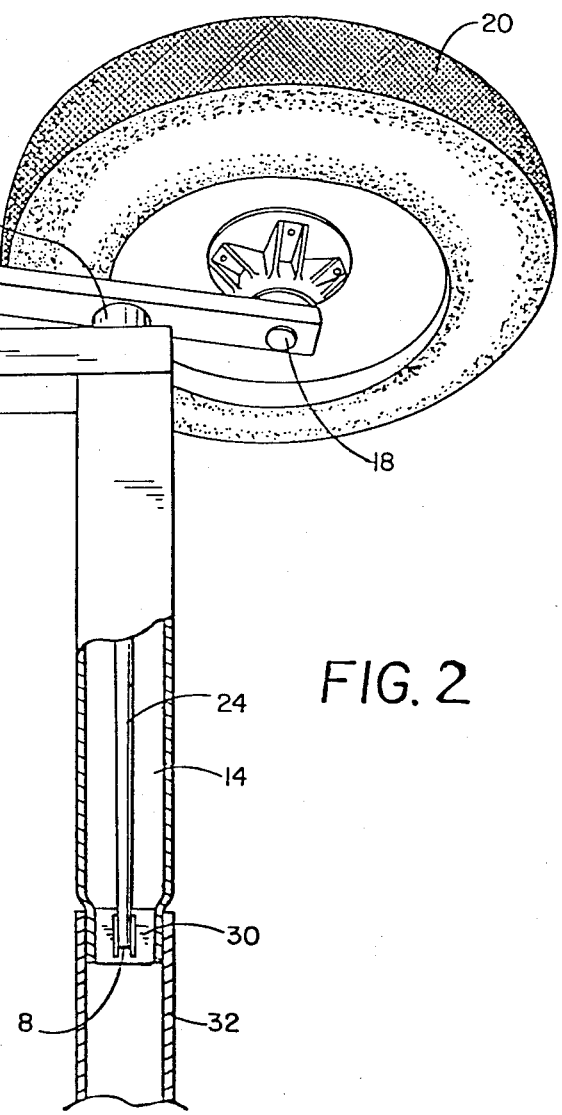

The trailer shown in FIG. 1 includes a pair of elongated side frame members 10 and 12, and an elongated transverse frame member 14. The suspension assembly of the invention includes a separate assembly for each wheel on each side of the trailer. The suspension assembly for the right wheel 20 is shown in FIG. 2. A similar assembly is provided for the left wheel 30.

The suspension assembly of FIG. 2 includes a stub axle 13 which extends into a rotatable socket 22 (FIG. 5) which is rotatably mounted in the transverse frame member 14 in a bearing 23. The stub axle 13 is attached to socket 22 to be rotatable with the socket. A radial arm 16 is attached to the outer end of stub axle 13, and an outwardly extending axle 18 is secured to the distal end of arm 16. The right trailer wheel 20 is rotatably mounted on axle 18.

One end of a flat torsion bar 24 extends into the rotatable socket 22 in a sliding fit with the socket. The socket may have a rectangular internal cross-section, so that the end of the flat torsion bar 24 extends into the socket diagonally across the socket from one corner to the other, and rotation between the socket and the bar is prevented. Of course, the socket may have any other appropriate configuration to engage a mating configuration of the end of bar 24 so that rotation between the bar and the socket may be prevented.

Figure 5:
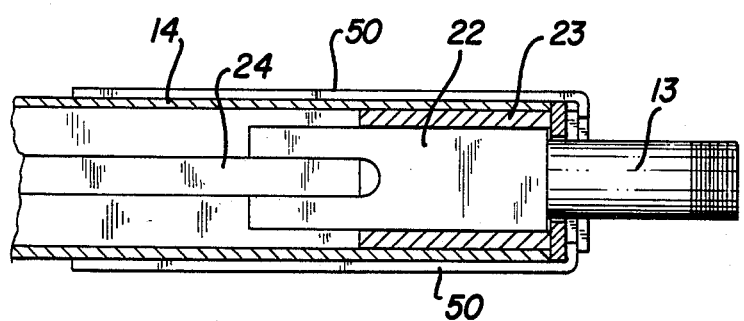
FIG. 5 is a sectional view taken along the lines 5—5 of FIG. 4.

Arm 16 is secured through stub axle 13 to the rotatable socket 22, so that angular movement of the arm tends to cause the socket to turn about its longitudinal axis within a bearing 23 which is mounted in the transverse frame member 14 (FIG. 5). With the construction described above, the transverse frame member 14 serves as the housing for the suspension assembly.

As mentioned above, a similar suspension assembly is used in conjunction with the left trailer wheel 30. The right and left side suspension assemblies of the invention are mounted to be completely dependent of one another, so that the frame width may be varied without interfering in any way with the individual suspension assemblies, merely by changing the length of an interconnecting member 32.

The flat torsion bar 24 extends internally along the interior of the transverse frame member 14 which, as shown in FIGS. 2 and 5, is hollow, and constitutes the housing for the suspension assembly. The frame member 14 includes an end portion 14A which receives the end of the side frame member 10, so that the entire suspension assembly, including the torsion bar 24, may be modular in form, with the trailer framework extending forward or back and may be mounted on a variety of trailers to accommodate different trailer lengths.

The right-hand end 8 of torsion bar 24 is received in a socket 30 which, for example, may be rectangular, hexagonal or octagonal in form, and which is fitted within the transverse frame member 14. Transverse frame member 14 is also made rectangular, hexagonal or octagonal, to match the shape of the socket 30, so as to prevent rotation of the socket and of the right-hand end of the torsion bar 24. The transverse frame member itself may be configured to have the appropriate shape to hold the end of the torsion bar 24 against rotation.

The construction described above permits the torsion bar to twist, and perform it suspension function, while also providing a structural cross-member for the trailer. The right-hand end of the transverse frame member 14 is interconnected with the left-hand end of the frame member by the tubular interconnecting member 32. The interconnecting member may be provided in different lengths so as to accommodate different trailer widths. The interconnecting member may also be rectangular, hexagonal, octagonal or a mere two-sided angle in section, and it serves to partially (although an X-bar is not required) reinforce the transverse frame member 14 in resisting any turning of the right-hand end of the flat torsion bar 24.

Figure 3:
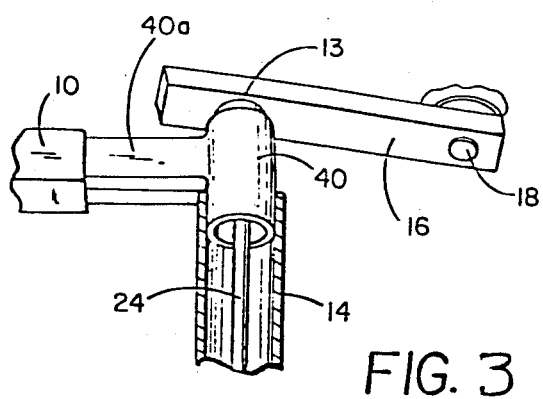
FIG. 3 is a fragmentary perspective view of a portion of the suspension assembly of FIG. 2 in a modified form.

The suspension assembly of the invention may have an alternate configuration, as shown in FIG. 3, in which the rotatable socket 22 which receives the end of torsion bar 24 is rotatably mounted in a split bracket 40, as is the stub axle 13 of radial arm 16, so that both the stub axle 13 and the rotatable socket 22 rotate about their common axis. The bracket 40 receives the end of the transverse frame member 14, and serves to connect the transverse frame member with the side frame member 10. For this purpose, the bracket 40 includes a radial arm 40a, which is received in the end of the side frame member 10, as shown.

Figure 4:
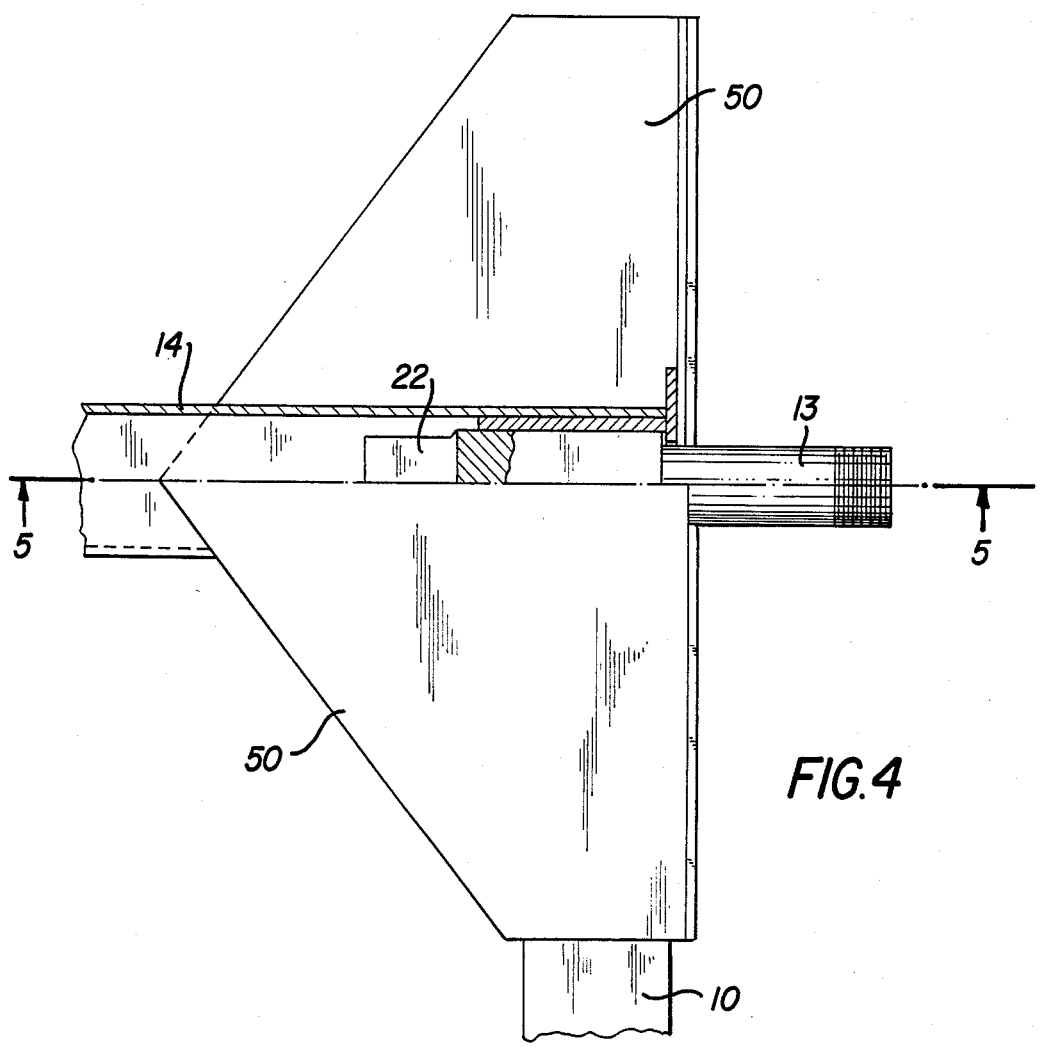
FIG. 4 is a top view, partially in section, of a portion of the suspension assembly in yet another alternate form.

In the embodiment of the invention shown in FIGS. 4 and 5, a reinforcing bracket 50 is provided having top and bottom flat planar triangular-shaped sections which are attached to the transverse frame member 14, and bracket 50 serves to connect the transverse frame member 14 to the side frame member 10. For that purpose, the bracket 50 is configured to receive the side member 10, as shown in FIG. 4. The bracket 50 may also be configured to receive another side member 10 at its other side to provide for fore or aft extensions of the trailer. Moreover, the flat planar sections of bracket 50 may be formed integral with the transverse frame member 14.

It is evident, therefore, that the suspension assembly of the invention is simpler and less expensive than the prior art assemblies in that it is involves a minimum of moving parts, and in that it eliminates the complexity of standard rear axle suspensions which include a multiplicity of nuts, bolts, plates, hangers and gussets.

The suspension assembly of the invention may be incorporated into the framework of the trailer in a manner to be stronger and less liable to permit frame flexibility as compared with the prior art suspensions.

The assembly of the invention is lighter than the prior art suspensions in that the wheel axles do not extend the full width of the trailer, with no other function than to connect the wheels. It is safer than the prior art assemblies because it serves to permit a lower center of gravity of the vehicle on/in which it is mounted. It may be used in conjunction with a wide variety of shapes and sizes of vehicle frameworks, which can be interchanged at the customer's will. Finally, the suspension assembly of the invention may be constructed to be easily assembled, and easily disassembled and stored.

It is evident that while particular embodiments of the invention have been shown and described, modifications may be made. It is intended in the claims to cover all modifications which come within the true spirit and scope of the invention.

I claim:

1. A suspension assembly for a vehicle, said vehicle including a frame having spaced side members and a hollow transverse member extending between said side members and secured thereto, said suspension assembly comprising: a first axle rotatably mounted on one side of said frame coaxial with said transverse member; a radially extending wheel-supporting arm secured to the outer end of said first axle; an outwardly extending second axle mounted on the distal end of said arm in spaced and parallel relationship with said axle; a wheel rotatably mounted on said second axle; a first socket mounted in coaxial relationship with said first axle and secured to the inner end of said first axle for rotation therewith about a common axis; a flat torsion bar extending along the interior of said transverse member in coaxial relationship with said first socket and having one end slidably received in said first socket in engagement with said first socket so as to prevent relative rotation between said torsion bar and said first socket; and a second socket mounted within said transverse frame member and spaced along said transverse frame member from said first socket and secured to said transverse frame member for receiving the other end of said torsion bar to prevent rotation thereof.

2. The suspension assembly defined in claim 1, in which said housing forms the transverse frame member for the assembly, and in which said socket is rotatably mounted within said transverse frame member, and said flat torsion bar extends coaxially along the interior of said transverse frame member.

3. The suspension assembly defined in claim 2, and which includes a second socket located within said transverse frame member for receiving the other end of said flat torsion bar to hold said other end of said flat torsion bar against rotation.

4. The suspension assembly defined in claim 1, and which includes a second like suspension assembly associated with the other of said side frame members completely independent of said first-mentioned suspension assembly, and a second wheel for the vehicle mounted on said second suspension assembly.

5. The suspension assembly defined in claim 1, and which includes a bracket having a first portion for receiving said transverse frame member, and having a second portion for receiving one of said frame members for securing the transverse frame member to said one of said side frame members.

6. The suspension assembly defined in claim 5, in which said bracket has a flat planar portion affixed to said transverse frame member.

7. The suspension assembly defined in claim 6, in which the flat planar portion of said bracket is integral with said transverse frame member.

8. The suspension assembly defined in claim 1, and which comprises a third axle rotatably mounted on the other side; a further radially extending wheel-supporting arm secured to the outer end of said third axle; an outwardly extending fourth axle mounted on the distal end of said further arm in spaced and parallel relationship with said third axle; a further wheel mounted on said fourth axle; a third socket mounted in coaxial relationship with said third axle and secured to the inner end of said third axle for rotation therewith about a common axis; a further flat torsion bar extending along said transverse member in coaxial relationship with said third socket and having one end slidably received in said third socket in engagement with said third socket so as to prevent relative rotation between said further torsion bar and said third socket; and a fourth socket mounted in said transverse member axially spaced from said third socket and secured to the transverse frame member for receiving the other end of said further flat torsion bar to hold said other end of said further flat torsion bar against rotation.

9. The suspension assembly defined in claim 8, in which said transverse member has first and second sections, with said second socket being mounted at the end of said first section and with said fourth socket being mounted at the end of said second section, and in which said transverse member includes an intermediate section interconnecting said first and second sections.

* * * * *